G. V. CURTIS.
COUNTERSINKING MACHINE.
APPLICATION FILED JULY 24, 1917.
1,307,897.
Patented June 24, 1919.
2 SHEETS—SHEET 2.
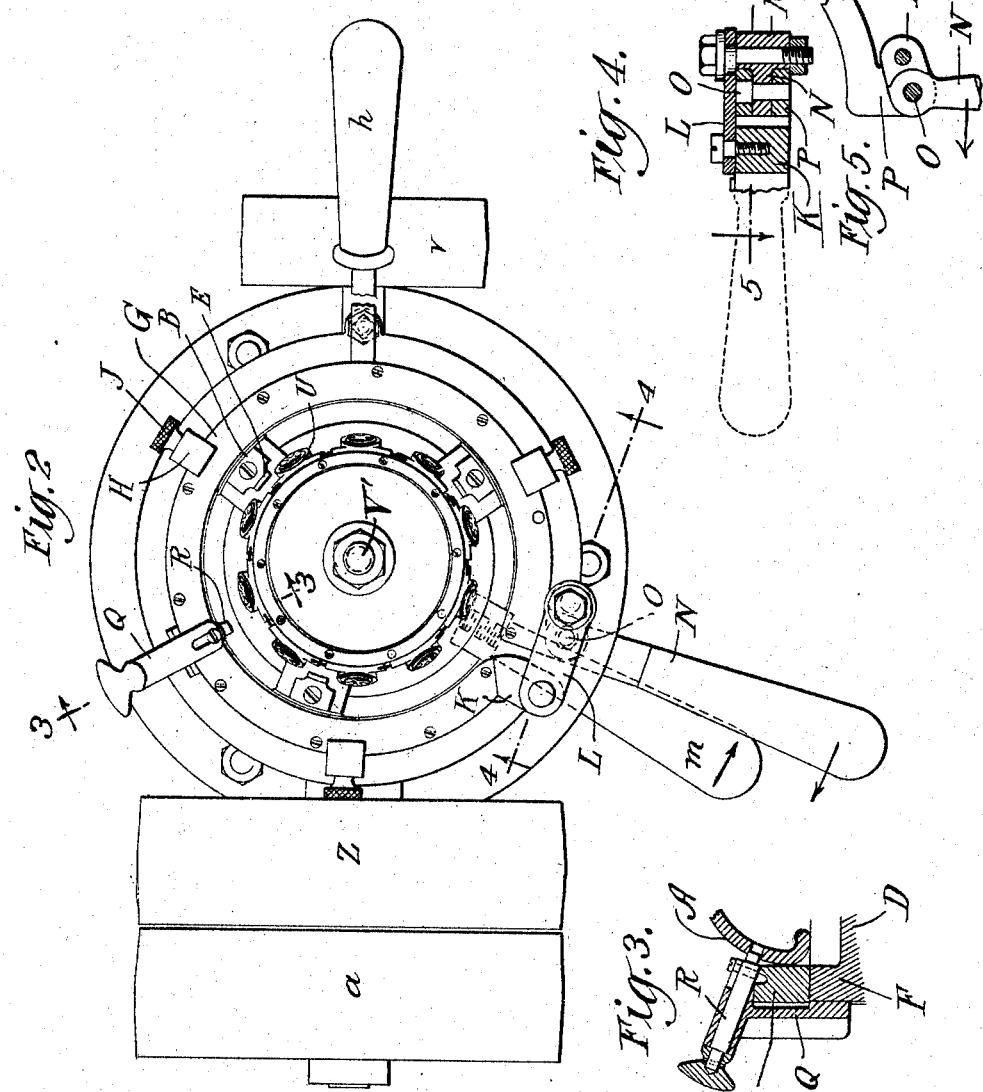
George V. Curtis, INVENTOR
BY
D. Anthony Usina, ATTORNEY

UNITED STATES PATENT OFFICE.

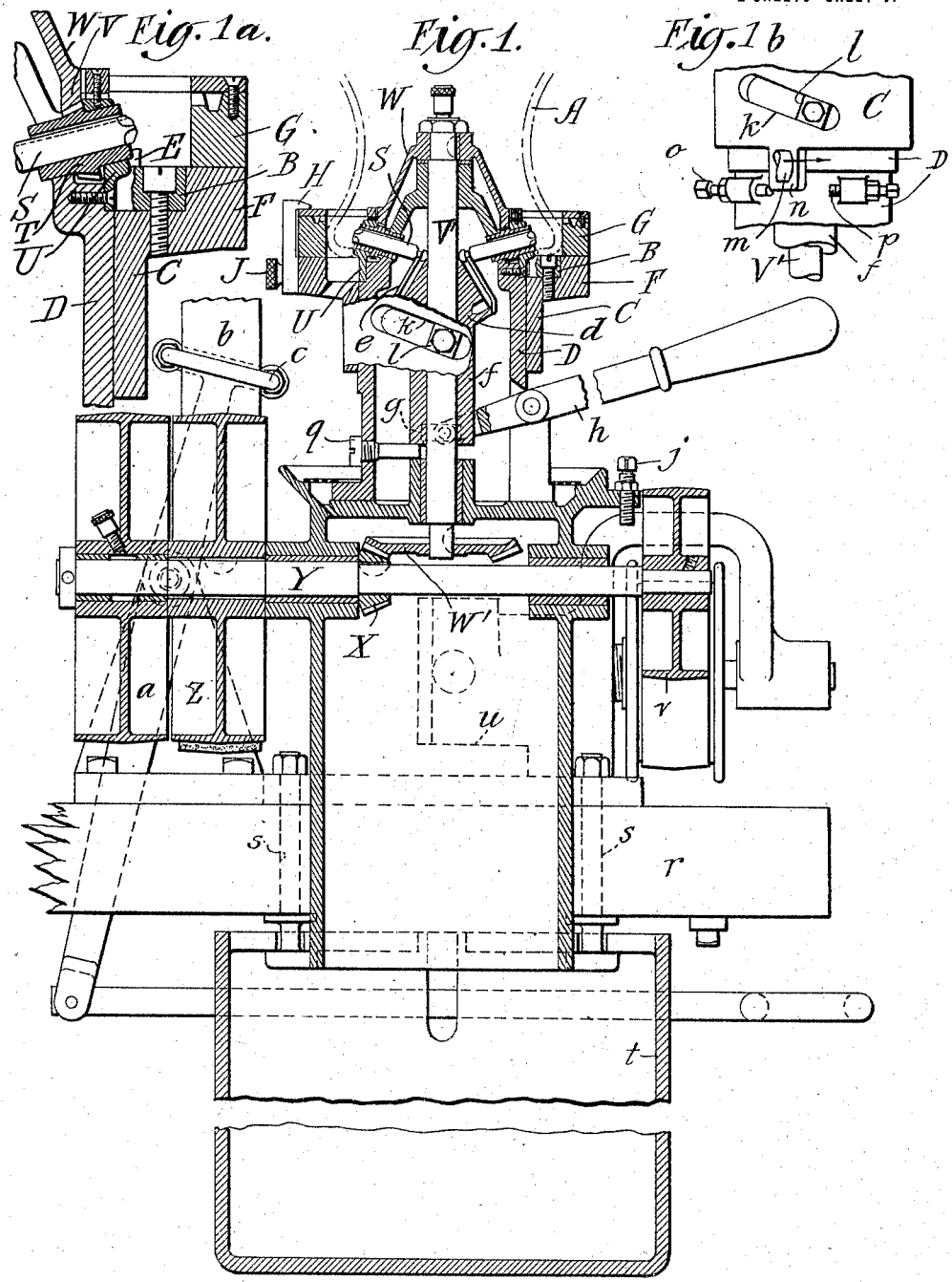

GEORGE V. CURTIS, OF SPRINGFIELD, MASSACHUSETTS, ASSIGNOR TO BAUSH MACHINE TOOL COMPANY, A CORPORATION OF MASSACHUSETTS.

COUNTERSINKING-MACHINE.

1,307,897.  Specification of Letters Patent.  Patented June 24, 1919.

Application filed July 24, 1917. Serial No. 182,414.

*To all whom it may concern:*

Be it known that I, GEORGE V. CURTIS, a citizen of the United States, residing in Springfield, Massachusetts, whose post-office address is % Baush Machine Tool Company, Springfield, Massachusetts, have invented certain new and useful Improvements in Countersinking-Machines, of which the following is a specification.

My invention aims to provide a machine for countersinking the inner ends of holes in automobile wheel hubs and similar pieces of work. Such hubs are of tubular sheet metal construction with holes drilled at intervals around them either at right angles to the axis or at an oblique angle thereto. Generally two rows of such holes are provided, those of one row being staggered with relation to those of the other. Heretofore, as far as I am informed the countersinking of such work has been done with a single spindle machine, countersinking one hole at a time. The machine of my invention however countersinks an entire row of holes in one operation, and combines a large output with accuracy and simplicity of operation. It may be adapted also to quickly shift to position for countersinking a second row of holes, where hubs of this class are to be made.

The accompanying drawings illustrate a machine embodying the invention.

Figure 1 is a central vertical section, partly in elevation, of the complete machine;

Fig. 1ª is an enlarged detail of Fig. 1;

Fig. 1ᵇ is an elevation of a detail;

Fig. 2 is a plan of the complete machine;

Fig. 3 is a section of a centering device taken on the line 3—3 of Fig. 2;

Fig. 4 is a section on the line 4—4 of Fig. 2;

Fig. 5 is a horizontal section on the line 5—5 of Fig. 4.

The machine illustrated is designed for countersinking holes at an oblique angle to the axis, and for two rows of such holes. But it will be understood that substantially the same construction may be employed for countersinking holes at right angles to the axis and for only one row of such holes or for any desired number of rows.

The lower part of the hub is indicated at A. It is centered on three blocks B which are fastened on a work carrier C mounted to have a vertical and an angular movement on the hollow head D of the frame of the machine. The centering blocks B are provided with flanges E which enter and fit within the hole in the end of the hub; the blocks being located within a top flange F of the carrier C.

A clamping ring G is located on top of the flange F of the carrier and held in position by means of three brackets H which are fastened to the carrier by means of screws J. The clamping ring G fits around the outer portion of the hub and may be clamped tightly thereon. The ring is split as shown in the lower part of Fig. 2 and has an ear K pivotally connected to one end of a link L, the opposite end of which is pivoted to an arm M on a hand lever N which in turn is pivoted at O to an ear P on the opposite end of the ring. The link L and arm M thus constitute a toggle operated by the lever N for clamping or unclamping the ring. The ring tends to spring open. With the parts in the position of Figs. 4 and 5 however, the toggle is swung slightly beyond its dead center and the ring is locked in a clamped position. By swinging the handle around in the direction of the arrow, the ring may be opened to withdraw the completed work and insert a new piece.

Mounted on the flange F of the carrier there is a bracket Q carrying at its upper end a sliding plunger R which can be pulled out or pushed in by means of a handle on its outer end, and which is positioned so as to enter one of the drilled holes in the hub A when the latter is turned at the correct angle and to hold it at this angle for proper registration of the countersinking tools with the drilled holes. The work being thus centered on the blocks B and held in the correct angle by the plunger R is clamped by means of the lever N in position for countersinking.

The countersinking tools S (10 in the case illustrated) have each a key fitting into a spline, (Fig. 1ª) in a hub of a pinion T so as to turn with the pinion and at the same time be free to move lengthwise. The pinions have hubs elongated at both sides of the toothed portion, and having an inside bearing in the head D of the machine and having separate outside bearings in blocks U fastened on the head of the machine. The several pinions T are driven by a common gear V having a conical hub W which is mounted on the top of the head of the machine and is keyed on a central shaft V' which passes down through the head of the machine and carries at its lower end a gear W', driven by a pinion X on the driving shaft Y, which carries fast and loose belt pulleys Z and a respectively, driven by a belt b which is shifted to one or the other of the pulleys by means of a belt shifter c.

The inner ends of the tools S are rounded and bear in longitudinal slots in a cam d. Near the inner end of each tool is an annular groove engaged by gibs e, overhanging the grooves in the cam. The hub f of the cam has near its lower end transverse slots g in which are shoes pivoted in the end of a hand lever h which is pivoted in a vertical slot in the upper part of the frame of the machine. Mounted on the base of the machine is a bolt j constituting an adjustable stop which is struck by the hand lever h and determines the limit of the downward movement of the latter. By pushing the lever h downward the feed cam d is pushed upward, the motion continuing until the lever strikes the stop j, which indicates that the countersinking has been carried to the desired depth. On releasing the handle the feed cam drops and the gibs retract the tools.

The work carrier C is formed with an oblique slot k in which is a block l mounted on the fixed upper portion D of the frame. The carrier C has a handle m, by turning which the carrier and the work piece are given an angular movement; the pin and slot k l serving at the same time to lower the carrier and the work with relation to the tools so that the next row of holes may be countersunk. The carrier C has also an ear n adapted to strike against one or the other of the adjustable stops o and p which are mounted on the fixed head of the machine, and which are set for the angular movement necessary to produce the staggering of the holes in the two rows.

In the lower part of the head of the machine is a screw q which holds the feed cam up and which can be unscrewed to allow the cam to drop a sufficient distance for the releasing of the tools. The clamping ring may then be lifted by detaching the clamps H which are fastened only by knurled screws. The tools may then be withdrawn for grinding or renewal.

The machine is designed to be mounted on a bench r and attached by means of bolts s which also hold an oil tank t suspended under the bench. An oil pump indicated in outline (since it constitutes no part of this invention) at u is driven from a pulley v on the driving shaft Y and supplies lubricant to the tool whence it runs down through suitable openings in the horizontal portions of the frame to the tank t. In operation, the work is first centered then turned to the correct angular position and clamped and lowered by turning the handle M in the direction indicated by the arrow in Fig. 2. The belt is shifted to the fixed driving pulley and the feed lever h depressed until it strikes its limiting stop. This lever is then released and the lever m turned in the opposite direction so as to raise the work. While this lever is so held the lever h is again pressed down until it reaches its limit and then released. This completes the work and, by unclamping, it is easily withdrawn and a new piece inserted.

Though I have described with great particularity in detail a certain embodiment of my invention, yet it is not to be understood therefrom that the invention is restricted to the particular embodiment disclosed. Various modifications thereof in detail and in the arrangement of the parts may be made by those skilled in the art without departing from the invention as defined in the following claim.

What I claim is:—

In a machine for countersinking holes in wheel hubs or the like, an upright hollow cylindrical supporting frame, a work carrier mounted for both rotary and axial movement on said supporting frame, said work carrier being formed with a slot arranged to coact with a block carried by said supporting frame whereby a rotary movement of the carrier will also cause it to move axially on the cylindrical supporting frame, a number of countersinking tools arranged in directions diverging from an axis, pinions for said tools mounted in fixed positions on the said supporting frame, a common gear for driving said pinions located above said pinions, a shaft for said gear extending downwardly through the said hollow supporting frame, gearing located below said frame for driving said shaft and a cam located within the supporting frame and slidable axially on said shaft for moving said countersinking tools into and out of engagement with the work.

In witness whereof, I have hereunto signed my name.

GEORGE V. CURTIS.